(12) United States Patent
Bury et al.

(10) Patent No.: US 10,469,083 B2
(45) Date of Patent: Nov. 5, 2019

(54) BREAKDOWN-BASED PHYSICAL UNCLONABLE FUNCTION

(71) Applicants: IMEC VZW, Leuven (BE); Katholieke Universiteit Leuven, Leuven (BE)

(72) Inventors: Erik Bury, Ramillies (BE); Jacopo Franco, Heverlee (BE); Geert Hellings, Halle (BE); Robin Degraeve, De Pinte (BE); Benjamin Kaczer, Leuven (BE)

(73) Assignees: IMEC vzw, Leuven (BE); Katholieke Universiteit Leuven, Leuven (BE)

( * ) Notice: Subject to any disclaimer, the term of this patent is extended or adjusted under 35 U.S.C. 154(b) by 0 days.

(21) Appl. No.: 15/644,614

(22) Filed: Jul. 7, 2017

(65) Prior Publication Data
US 2018/0013431 A1 Jan. 11, 2018

(30) Foreign Application Priority Data
Jul. 10, 2016 (EP) ..................................... 16178758

(51) Int. Cl.
*H03K 19/003* (2006.01)
*H01L 21/326* (2006.01)
(Continued)

(52) U.S. Cl.
CPC ............. *H03K 19/003* (2013.01); *G09C 1/00* (2013.01); *H01L 21/326* (2013.01);
(Continued)

(58) Field of Classification Search
None
See application file for complete search history.

(56) References Cited

U.S. PATENT DOCUMENTS 8,741,713 B2 6/2014 Bruley et al.
9,613,714 B1 4/2017 Wong et al.
(Continued)

FOREIGN PATENT DOCUMENTS

WO WO 2008/015603 A1 2/2008

OTHER PUBLICATIONS

Alam, M.A. et al., "Theory of 'Current-Ratio' Method for Oxide Reliability: Proposal and Validation of a New Class Two-Dimensional Breakdown-Spot Characterization Techniques," Electron Devices Meeting, IEDM Technical Digest, IEEE International, 2005, 4 pages.

(Continued)

*Primary Examiner* — Crystal L Hammond
(74) *Attorney, Agent, or Firm* — Knobbe Martens Olson & Bear LLP (57) ABSTRACT

A device and a method for implementing a physically unclonable function is disclosed. In one aspect, the device includes at least one electronic structure including a dielectric. A conductive path is formed at a random position through the dielectric due to an electrical breakdown of the dielectric, or the electronic structure is adapted for generating an electrical breakdown of the dielectric such that the conductive path is formed through the dielectric at a random position. The at least one electronic structure is adapted for determining a distinct value of a set comprising at least two predetermined values. The distinct value is determined by the position of the conductive path through the dielectric.

20 Claims, 5 Drawing Sheets (51) Int. Cl.
*H01L 23/528* (2006.01)
*H01L 27/02* (2006.01)
*H01L 27/088* (2006.01)
*H04L 9/14* (2006.01)
*H01L 23/00* (2006.01)
*H04L 9/08* (2006.01)
*H04L 9/32* (2006.01)
*G09C 1/00* (2006.01)
*H03K 17/00* (2006.01)

(52) U.S. Cl.
CPC .......... *H01L 23/528* (2013.01); *H01L 23/573* (2013.01); *H01L 27/0203* (2013.01); *H01L 27/088* (2013.01); *H04L 9/0861* (2013.01); *H04L 9/0866* (2013.01); *H04L 9/0894* (2013.01); *H04L 9/14* (2013.01); *H04L 9/3278* (2013.01); *H03K 17/002* (2013.01)

(56) References Cited

U.S. PATENT DOCUMENTS

| | | | |
|---|---|---|---|
| 9,811,689 B1* | 11/2017 | Tseng | G06F 21/73 |
| 2010/0237709 A1* | 9/2010 | Hall | B60L 53/52 |
| | | | 307/104 |
| 2012/0106235 A1* | 5/2012 | Christensen | G11C 11/4091 |
| | | | 365/149 |
| 2014/0301135 A1* | 10/2014 | Guo | H01L 43/08 |
| | | | 365/158 |
| 2015/0074433 A1* | 3/2015 | Zhu | G06F 1/26 |
| | | | 713/300 |
| 2015/0192637 A1 | 7/2015 | Falk et al. | |
| 2016/0148680 A1* | 5/2016 | Yoshimoto | G11C 13/004 |
| | | | 365/148 |
| 2017/0077046 A1* | 3/2017 | Gupta | H01L 27/0207 |
| 2017/0200508 A1* | 7/2017 | Grigoriev | G11C 7/24 |
| 2017/0272258 A1* | 9/2017 | Tanamoto | H04L 9/3278 |
| 2017/0345492 A1* | 11/2017 | Yoshimoto | G06F 3/0604 |

OTHER PUBLICATIONS

Ganta, Dinesh et al., "A Highly Stable Leakage-Based Silicon Physical Unclonable Functions," 24th Annual Conference on VLSI Design, 2011, pp. 135-140 (6 pgs).

* cited by examiner

BREAKDOWN-BASED PHYSICAL UNCLONABLE FUNCTION

RELATED APPLICATIONS

This application claims priority to European application no. EP 16178758.5 entitled "BREAKDOWN-BASED PHYSICAL UNCLONABLE FUNCTION," filed on Jul. 10, 2016, and incorporated herein by reference in its entirety.

BACKGROUND

Technological Field

The disclosed technology relates to computer-implemented cryptography and security, and particularly to providing a physical unclonable function (PUF) for systems and hardware providing tampering detection and/or encryption.

Description of the Related Technology

In electronic devices such as portable computers, products with hardware restriction, RFID tags and scanners, vehicle electronics, mobile phones, and chips, electronic identification distinguishes the product and/or its legitimate user from others. Correct identification is particularly important in case of wireless transmission of information between devices and information networks ("Internet of Things"), in which electronic compatibility problems may arise. The encryption of information can prevent unauthorized users from accessing the information or take control of the device.

For small, portable devices, identifiers and encryption keys are commonly provided in a chip. For example, a key in the form of a bit string can be stored in a chip. The legitimate user may introduce this key to use the device. However, if the key is stored in a memory chip within the device, in a non-volatile memory (NVM), for example a FLASH memory, security can be compromised if the stored key is recovered from memory by direct hardware inspection. Furthermore, even in the best of cases in which the device and the encryption system can be implemented in the same chip, a large area may be required for key storage and implementation of encryption functions, which reduces the number of chips per wafer, increasing costs.

Such key storage as known in the art has the disadvantage that it may be relatively simple for an unauthorized user to extract or copy (clone) the key from the memory and use it to gain access to the device, or even change the key in the memory. Additionally, these memories may be costly. Their implementation may not always integrate easily with the rest of the device. They may require stored electrical charge, and may thus require energization.

A type of electronic implementation, for example in a chip, is known in the art, in which random readable features may be implemented. Usually these features are physical properties, commonly referred to as Physical Unclonable Functions (PUFs), that are easy to evaluate but difficult to predict, for example due to the usage of the randomness of process induced uncontrollable features. Such PUFs may be typically implemented in integrated circuits and used for security applications. The physical properties may be electronically readable and may depend on random factors introduced during manufacturing and/or in use, for example a dependency on random aspects of the physical microstructure and/or nanostructure of a device component may be used to generate a random cryptographic key. Several implementations are known in the art of such PUFs that are based on arrays of electronic elements with a given condition which is not controllable, such as stochastic variations in doping levels of a semiconductor. For example, an array of elements may be randomly broken, in which each element returns a value depending on whether it is broken or not, such that this value becomes a bit of information in a bit array representative of an the encryption key. However, the randomness of these types of PUF may not be perfect, due to the influence of factors such as the stress signal and the temperature. Furthermore, such prior-art PUF implementations may require a large area to provide sufficient bits if a particularly secure key is required. Additionally, such prior-art PUFs may not be completely reliable, because under certain conditions they can change their value, for example under thermal conditions, such as high temperature environments, or due to time-dependent variability. Also, it should be noted that particular prior art PUF implementations may be layout dependent, such that a systematic bias of the PUF output could arise if not carefully accounted for in the layout of the design.

Moreover, such PUFs may be not completely unclonable, for example because a key can be obtained by unauthorized means, for example by emission spectroscopy.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

An objective of the disclosed technology is to provide a good physical unclonable function in a compact, reliable, secure and efficient device, that allows for usage in encryption, authorization, authentication and/or similar digital security related applications, for example using a random, yet controllable, key generation.

References to physical unclonable functions herein may refer to what is understood in the art as a "weak physical unclonable function."

An advantage of the disclosed technology is that an implementation of a physical unclonable function is provided that is inexpensive, substantially seamlessly integratable, and consumes little, or even no, static energy.

Another advantage of the disclosed technology is that a PUF can be provided that is easily implementable and that is robust against layout variations, for example less layout dependent than, for example, a prior-art PUF device based on SRAM technology.

The above objective is accomplished by a method and device according to the disclosed technology.

One aspect is a PUF device for implementing a physically unclonable function. The PUF device includes at least one electronic structure, in which each electronic structure includes a dielectric. Either a conductive path is formed at a random position through the dielectric due to an electrical breakdown of the dielectric, or the electronic structure is adapted for generating an electrical breakdown of the dielectric such that the conductive path is formed through the dielectric at the random position. Each of the at least one electronic structure is furthermore adapted for outputting a distinct value of a set including at least two predetermined values, for example a set including Boolean values 0 and 1, in which the distinct value is determined by the position of the conductive path through the dielectric.

In an embodiment, the PUF device includes at least one electronic structure. Each electronic structure includes a dielectric in which a conductive path is formed at a random position through the dielectric due to an electrical breakdown of the dielectric. Each of the at least one electronic structure is adapted for outputting a distinct value of a set including at least two predetermined values. The distinct value is determined by the position of the conductive path through the dielectric.

An advantage of the disclosed technology is that one breakdown per electronic structure element can be generated. The position of this breakdown per element has a distribution. The distribution can be a symmetric distribution. The distribution can be a uniform, distribution.

In an embodiment, the at least one electronic structure includes at least one circuit element that includes at least a first terminal, a second terminal and a third terminal directly or indirectly electrically insulated from each other by the dielectric. For example two terminals, such as a drain and a source terminal of a transistor, may be indirectly insulated from each other due to the dielectric.

In an embodiment, the at least one electronic structure is adapted for determining the distinct value by detecting the position as being either closer to the first terminal or closer to the second terminal.

In an embodiment, the at least one circuit element includes a field effect transistor including a gate dielectric, a drain (D), a source (S) and a gate terminal (G).

In an embodiment, the position is a position between the source and the drain.

In an embodiment, the conductive path is formed in the at least one electronic structure through the gate dielectric. In an embodiment the at least one electronic structure is adapted for generating the electrical breakdown in the gate dielectric such that the conductive path is formed through the gate dielectric. In an embodiment the conductive path conductively connects the gate terminal to at least one of the source and the drain.

An advantage of the disclosed technology is that the elements can be made in standard manufacturing routes on a semiconductor wafer. It is a further advantage that the elements can be fabricated with a high density and small size, reducing risk of decryption by spectroscopic analysis.

In an embodiment the at least one electronic structure is adapted for obtaining a voltage drop at the drain and a voltage drop at the source, and determining the distinct value as a function of these voltage drops.

In an embodiment, the at least one electronic structure may include at least a further circuit element that includes at least a first terminal, a second terminal and a third terminal electrically insulated from each other by the dielectric, the third terminal of the circuit element being connected to the third terminal of the further circuit element.

In an embodiment the PUF device is adapted for detecting a transistor breakdown in each of the circuit element and the further circuit element of the electronic structure.

In an embodiment, the electrical breakdown is or includes a soft breakdown.

In an embodiment the PUF device includes a compliance-limiting transistor switch in series with the at least one circuit element. In an embodiment, the compliance-limiting transistor switch is connected in series with the third terminal of the at least one circuit element. In an embodiment, the compliance-limiting transistor switch is connected in series with the first terminal and the second terminal of the at least one circuit element, for example the first and second terminal may each be connected a compliance-limiting transistor switch.

In an embodiment, the PUF device includes multiple electronic structures organized in an array. In an embodiment the PUF device further includes a readout system for addressing an individual electronic structure, or a subset of the electronic structures, as a function of row and/or column addresses and outputting the distinct value of the addressed electronic structure or the addressed subset of electronic structures.

An advantage of the disclosed technology is that the wafer space may be efficiently utilized, for example reducing area, by providing a single readout circuit for the electronic structures of the array.

In an embodiment, the readout system includes a row multiplexer and/or a column multiplexer. The readout system may include at least one comparator for comparing a pair of voltage differences sensed at a corresponding pair of different regions of the dielectric in the addressed electronic structure.

In an embodiment, the PUF device further includes a multiple arrays in a semiconductor die, each array including multiple electronic structures, each array being adapted for storing a corresponding encryption key.

An advantage of the disclosed technology is that it is possible to introduce several layers of security. Another advantage is that it is possible to refresh the key by inducing breakdown in spare arrays, which can be done during manufacture or later, during use of the device.

Another aspect is a method for implementing a physically unclonable function. The method includes providing a device that includes at least one electronic structure, each electronic structure including a dielectric. The method further includes generating an electrical breakdown of the dielectric such that a conductive path is formed, in each of the at least one electronic structure, through the dielectric at a random position. The method further includes determining, for each of the at least one electronic structure, a distinct value of a set including at least two predetermined values, wherein the distinct value is determined by the position of the conductive path through the dielectric of the electronic structure.

In an embodiment, providing the device includes providing the device including an array of transistors. In an embodiment, generating the electrical breakdown includes applying a high gate bias on each transistor to form a conductive path between a gate and randomly either a source or a drain of the transistor.

In an embodiment, generating the electrical breakdown includes generating plasma damage during the step of providing the device.

An advantage of the disclosed technology is that damage is randomized. Another advantage is that the step of providing PID protection can be avoided for facilitating plasma damage and providing breakdown, thereby reducing manufacturing time.

Aspects of the disclosed technology are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF CERTAIN ILLUSTRATIVE EMBODIMENTS

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings disclosed technology Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosed technology described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the disclosed technology. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the disclosed technology, various features of the disclosed technology are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the disclosed technology reference is made to "electronic structure", reference is made to an electronic device component, for example an integrated circuit component, having at least a first electrical terminal and a second electrical terminal, in which a physical entity can be inscribed or included. Non-limiting examples of electronic structures include: a single circuit element such as a switch or a transistor, or two or more circuit elements, for example two capacitors or transistors having a common connection, such as two transistors with interconnected gates.

The electronic structures of the disclosed technology may include physical entities embodied therein, which generate an individual fingerprint, making each structure distinct from another. A distinct value can be assigned to the electronic structure depending on the type of physical entity embodied therein. These physical entities, when they are easy to evaluate but difficult to predict, receive the common term of "physical unclonable function", or PUF. It is said that a PUF has been successfully attacked when the physical entity is retrieved (cloned) by means other than the intended, for example by unauthorized means. Such attacks can be used in de-encryption techniques to retrieve a secret key from the system, for example to "break the code".

Where in embodiments of the disclosed technology reference is made to "breakdown," "electrical breakdown" or "dielectric breakdown," reference is made to conductive paths formed in a dielectric layer due to the application of a voltage that exceeds a breakdown voltage of the dielectric, for example thus "breaking" the insulation, and/or to conductive paths formed in a dielectric layer due to stress-induced leakage, for example an induced gate leakage or enhanced leakage of a transistor. Specifically, "transistor breakdown" refers to a "breakdown" of a gate oxide in a transistor, for example to the generation of one or more conductive paths in the dielectric layer of a transistor, for example the gate oxide of a metal oxide semiconductor field-effect transistor (MOSFET). In MOSFETs, breakdown usually may take place due to formation of linear agglomerations of defects in the oxide, which can trap charges under a voltage difference, percolate through the thickness and expand, thus creating a conductive path.

The related term "soft breakdown" (SBD), typically seen in thin-oxide devices, refers to a type of breakdown of a transistor in which, in spite of small conductive paths in the oxide, the transistor can still provide modulation of the source to drain current. There is an increase of leakage current in the OFF state. The I-V characteristics of an SBD are not necessarily ohmic as they are governed by the local potential in the channel and the physical position and energetic configuration of the oxide defects, in contrast with the ohmic, usually linear, I-V characteristics of total or "hard" breakdown. Furthermore, a breakdown can take place in other circuit elements, such as capacitors (for example three-terminal capacitors) or in BJTs.

In a first aspect, the disclosed technology relates to a device for implementing a physically unclonable function, for example for an encryption system. The device includes at least one electronic structure, in which the (or each of the) at least one electronic structure includes a dielectric, for example an insulator or a resistive semiconductor material. In the device according to embodiments of the disclosed technology, a conductive path is formed at a random position through the dielectric due to an electrical breakdown of the dielectric, for example due to an electrical breakdown or due to the formation of a leakage path in dielectric, when the electronic structure is initialized. In the device according to embodiments of the disclosed technology, when the electronic structure has not been initialized, the electronic structure is adapted for generating an electrical breakdown of the dielectric such that the conductive path is formed through the dielectric at the random position.

The (or each of the) at least one electronic structure is furthermore adapted for determining a distinct value of a set including at least two predetermined values, wherein this distinct value is determined by the position of the conductive path through the dielectric, for example for determining this distinct value when the electronic structure has been initialized.

In other words, embodiments of the disclosed technology may relate to such device in an uninitialized state and/or after initialization. For example, a device in an uninitialized state is adapted for initializing the electronic structure by generating an electrical breakdown of the dielectric such that a conductive path is formed through the dielectric at a random position, and in which the at least one electronic structure is adapted for determining, After such initialization, a distinct value of a set including at least two predetermined values, is determined by the position of the conductive path through the dielectric.

Furthermore, embodiments of the disclosed technology may relate to the device in an initialized state in which a conductive path is formed at a random position through the dielectric due to an electrical breakdown, for example a pre-existing or pre-occurred electrical breakdown, of the dielectric, and in which the at least one electronic structure is adapted for determining a distinct value of a set including at least two predetermined values, wherein this distinct value is determined by the position of the conductive path through the dielectric.

It shall also be understood by the skilled person that a device in accordance with embodiments of the disclosed technology may include at least one such electronic structure in an initialized state and at least one such electronic structure in an uninitialized state.

In a device in accordance with embodiments of the disclosed technology, the at least one electronic structure may include multiple electronic structures organized, for example arranged, in an array. For example, the device may include an array of electronic structures for implementing a physical unclonable function. Thus, the device contains at least one such electronic structure, in an embodiment two or more of such electronic structures, for example two or more of such electronic structures arranged in at least a logical array, for example in a logical and physical array, for example a one-dimensional row or a two-dimensional grid.

Each electronic structure may be adapted to represent a distinct value, for example a logic value, depending on the physical entity embedded therein. The type of physical entity determines the distinct value, but the physical entity may be always present in each electronic structure after initialization by generating the electrical breakdown in the electronic structure. In other words, the PUF is not based on the presence or absence of the physical entity in the electronic structure, but rather on the type of physical entity in each electronic structure. This type may correspond to a classification of the possible distinct configurations, for example locations, of the conductive path through the dielectric.

Because every electronic structure, after initialization, includes a physical entity that determines the PUF, a good randomness can be provided when initializing the device, for example the value probability distribution (for example a logic bit distribution) may be symmetrical. For example, the electronic structure is adapted for determining the distinct value, out of a set of possible values including at least two predetermined values, wherein this distinct value is determined by the position of the conductive path through the dielectric, after this conductive path has been caused by a generated electrical breakdown, for example generated to initialize the electronic structure, for example to generate a persistent, random bit in the electronic structure. Furthermore, the value's probability distribution may be adapted to a predetermined target distribution, in accordance with particular embodiments of the disclosed technology, for example by tuning voltages on contacts, for example source and drain contacts, during initialization or by applying appropriate voltages during readout. Thus, a uniform distribution, for example a 50% probability of "0" and a 50% probability of "1", may be obtained in accordance with embodiments of the disclosed technology, for example even for intrinsic asymmetric electronic structures. Furthermore, the value distribution may be adjusted to a predetermined non-uniform target distribution, if so required by a particular application.

The (or each of the) at least one electronic structure may include one or more circuit elements. Particularly, at least one of the one or more circuit elements may include the dielectric, for example an electric insulator. For example, the dielectric may include a gate material, for example a gate oxide, such as a dielectric layer that separates the gate terminal of a transistor from the source and drain terminals, or the dielectric may include a dielectric material that separates terminals in a capacitor.

In some embodiments of the disclosed technology, the at least one circuit element may include at least three contacts or terminals: a first terminal and a second terminal, and a third terminal for applying a biasing potential. These at least three terminals in each circuit element may be electrically insulated from each other by the dielectric, for example directly or indirectly electrically insulated by, or due to, the dielectric.

For example, the first terminal may be arranged on one side of a layer or slab formed by the dielectric, and the second terminal and the third terminal may be arranged on the other side of this layer or slab. For example, a distance between the first and second terminal may be about equal, for example equal, to a distance between the first and third terminal. For example, the second and third terminal may be arranged at a distance from each other and in contact with the dielectric, such that the dielectric electrically insulates and/or isolates the second and third terminal from each other. For example, the first, second and third terminal may be electrically separated by the dielectric.

The at least one electronic structure is adapted for generating an electrical breakdown of the dielectric, such that the electrical breakdown forms a conductive path through the dielectric at a random position. Thus, after the electrical breakdown has been generated, the element may include a contact path, or breakdown spot, between one of the first and the second terminal on the one hand, and the third biasing terminal on the other hand.

For example, the random position may be determined in a stochastic sense, for example in accordance with a predetermined probability distribution, by applying a first voltage between the first terminal and the second terminal and, simultaneously, a second voltage between the first terminal and the third terminal. The first and second voltage may thus be selected in accordance with the predetermined target probability distribution. Furthermore, in embodiments according to the disclosed technology, the device may also be adapted for programming at least one of the at least one electronic structure in a deterministic way, if so desired, for example by reducing the predetermined probability distribution to a degenerate or deterministic distribution, for example by applying only the first or the second voltage referred to hereinabove.

This contact path may produce a detectable leakage current in the circuit element. While each electronic structure in the device, for example in the array, presents a breakdown, when it has been initialized, the precise position of the breakdown spot in each separate electronic structure was or can be generated in an unpredictable and random manner. Thus, the relative position of the breakdown spot in the electronic structure may be used as the PUF, as a single bit of the PUF per electronic structure, according to some embodiments of the disclosed technology. Because every electronic structure can contain a breakdown spot, systematic device-to-device variation may be improved, and the probability distribution of the values can be made highly symmetric, for example uniform.

In the following, a first exemplary embodiment is described with reference to an array of electronic structures in which each electronic structure includes a single circuit element, such as a transistor, specifically a MOSFET. However, any suitable circuit element with two terminals and a gate or bias terminal, allowing the generation and detection of a leakage current between one of the two terminals and the bias terminal may be suitable for use in embodiments in accordance with the disclosed technology. For example, a three-terminal capacitor can be used in some embodiments of the disclosed technology. Further embodiments may include a field-effect transistor (FET) such as a metal-oxide-semiconductor FET (MOSFET), etc. The disclosed technology is not limited to the exemplary transistors. Particularly, various types of field-effect transistor based on a dielectrically insulated gate, for example a metal oxide semiconductor gate, may be used in embodiments of the disclosed technology, such as a vertical FET (VFET) or a tunnel FET (TFET). For example, the circuit element may include multiple FETs with a connected gate.

For example, in a device in accordance with embodiments of the disclosed technology, the at least one circuit element may include a field effect transistor that includes a gate dielectric, a drain, a source and a gate terminal. The at least one electronic structure may thus be adapted for generating the electrical breakdown in the gate dielectric such that the conductive path is formed, at the random position, which may be a random position between the source and the drain, through the gate dielectric, to conductively connect the gate terminal to one of the source and the drain.

It is an advantageous property of the FET being a MOSFET, in accordance with some embodiments of the disclosed technology, that a breakdown path, for example a soft-breakdown path, can be obtained that has a good randomness of spatial occurrence within the transistor, that can be easily implemented (for example during manufacture), that has a high stability, and/or that can be substantially independent of layout or circuit configuration. Thus, breakdown in MOSFETs can be used advantageously as basis for a PUF by creating such breakdowns purposefully, in a random yet controlled way. One or more of the parameters of the breakdown can be used as a PUF-criterion.

An exemplary embodiment of the disclosed technology may use the position of the breakdown spot to determine a PUF value, for example a key bit, which may be read out by determining a type of leakage current present in the element. For example, in the case of a transistor, for example a FET, for example a MOSFET, a source-gate breakdown or a drain-gate breakdown may each have different logical outputs assigned: in which a leakage current taking place between source and gate may output a logical 0 (or 1), and a breakdown between drain and gate may output a logical 1 (or 0). Furthermore, such breakdown may occur in a central region of the oxide, for example not clearly and unambiguously on the drain side or the source side, and the logical output may be determined by a relative resistance between gate and source on one hand and gate and drain on the other hand.

Thus, in a device in accordance with embodiments of the disclosed technology, the at least one electronic structure may be adapted for obtaining a voltage drop at the drain and at the source, and determining the distinct value as a function of the voltage drop representative of the position.

Figure 1:
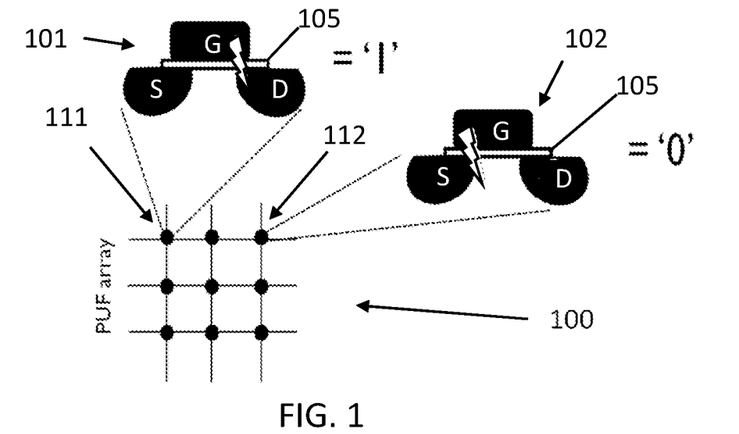
FIG. 1 illustrates a device in accordance with embodiments of the disclosed technology, in which each electronic structure for providing a breakdown signal is formed by a single circuit element.

FIG. 1 shows, schematically, a device 100 in accordance with embodiments of the disclosed technology, for example including a PUF array of 9 electronic structures. The device 100 may be included in a system with several addressing lines (for example arranged as rows) and/or readout lines (for example arranged as columns), embodiments of the disclosed technology not being limited thereto.

In an uninitialized form, each of the electronic structures is adapted for generating an electrical breakdown of the dielectric 105, such that the electrical breakdown forms a conductive path through the dielectric at a random position.

Likewise, in an initialized form, each of the electronic structures includes a dielectric 105 including a conductive path through the dielectric at a random position formed by an electrical breakdown of the dielectric 105. The electronic structure is furthermore adapted for determining a distinct value of a set including at least two predetermined values, for example a logic '0' or '1' value, wherein the distinct value is determined by the position of the conductive path formed by breakdown through the dielectric.

A first electronic structure 101 may include a breakdown, indicated by a lightning symbol, in a position between a gate G and a drain D, such that at the corresponding address 111 of the array, a logical '1' would be read from that first structure 101. A further electronic structure 102 may include a breakdown between the gate G and the source S, such that a logical '0' would be read at the corresponding address 112 of that further structure 102 in the array. Thus, each of the elements in the exemplary 9 positions may store one bit (0 or 1, depending on the position of the breakdown spot within its channel). These bits may be stored without requiring a stored charge (thus saving energy) and without requiring external storage, because the bit may be physically linked to each transistor. Furthermore, this means of storage can advantageously provide a good protection against tampering. For example, an encryption key, created by generating an electrical breakdown of the dielectric in each electronic structure, doesn't need to be stored in a separate memory, because the information is embedded in the circuit element.

A device in accordance with embodiments of the disclosed technology may detect the breakdown spot location along the element, for example the spot location along the channel of each MOSFET, as being either closer to the first terminal, for example the source, or the second terminal, for example the drain, of the electronic structure, and quantify this location by outputting a logical 0 or 1 respectively. For example, in embodiments including MOSFET elements, the breakdown spot location can be detected along the channel of each MOSFET as being either closer to the source or the drain, and this location may be quantified by outputting a logical 0 or 1 respectively. Both cases result in an array of electronic structures with assigned values of 0 or 1. Such embodiments thus encode, after initialization, one bit of information in each electronic structure (for example 1-bit transistor).

For these types of electronic structure, in which the readout checks if the breakdown took place either between gate and source or between gate and drain, for example if it took place closer to the source or to the drain, the entropy (or the randomness) of each electronic structure can advantageously always be tuned to 50%, by tuning the threshold position.

For example, the threshold position may correspond to a predetermined binning criterion, such as selecting a median position of all observed, or theoretically observable, positions as threshold, for example such that 50% of bits, on average, are set to 0, and 50% of bits, on average, are set to 1. This threshold position may correspond to a physical central location in the insulator, for example in the middle of a transistor channel.

This tuned threshold position may, for example, be applied by adjusting a sense amplifier.

Alternatively, a systematic bias, for example as represented by a specifically adapted threshold position to improve randomness, may be accounted for during initialization by applying different bias voltages on a source and a drain terminal during initialization.

Furthermore, the intended target distribution is not necessarily limited to a uniform distribution. For example, if a particular application requires a biased distribution, this can also be provided by tuning the threshold position appropriately. If a particular application requires that a bit or particular bits are set in a deterministic way, for example programmed to predetermined values, the target distribution, and hence the corresponding threshold, can even be adjusted such as to reduce the probability distribution to a degenerate or deterministic distribution.

Embodiments of the disclosed technology may provide a way to obtain the position of a breakdown within the channel of the transistor (steady source or drain breakdowns), thus allowing the storage and recovery of a single bit per transistor. However, in some embodiments of the disclosed technology, the position of the breakdown spot can be discerned with higher resolution. In these embodiments, each transistor is not limited to store 1 bit. The position of the breakdown spot can be modeled from the charge trap zone along the channel, in which current leakage takes place, and the models can be compared with the results of the current leakage. Other methods for retrieving the position of the breakdown spots can be used. The value assigned to the transistor would be dependent of the position of the breakdown spot: for example, the channel of a MOSFET can be divided in three regions, one adjacent to the source, one adjacent to the drain, and a zone in between, separating the other two, in the central region of the gate. Thus, either one of three possible digits could be stored in a transistor and be read by detecting the position of the breakdown in the channel. In general, some embodiments of the disclosed technology may also allow to obtain analog readout of the breakdown position, for example describing the position in the channel by an analog signal, such that multiple digits per transistor can be stored for the PUF application, and more quantized levels are possible. For example, multi-bit coding may be obtained, depending on the fabrication process (for example depending on the control of the body bias) and on the accuracy of the location detection.

Embodiments of the disclosed technology are not limited to a single transistor per electronic structure in the device, for example in an array of the device. Thus, multiple transistors, capacitors, or other circuit elements can be used per electronic structure. A second example of an embodiment in accordance with the first aspect of the disclosed technology, shown in FIG. 2, includes an exemplary device 200, including, as before, a PUF array of 9 electronic structures, in which each electronic structure 210, 220 includes two circuit elements (for example FETs) connected by their respective third terminals, for example by their respective gate terminals, to a common line, in a configuration similar to a "current mirror". Each electronic structure, according to embodiments of the disclosed technology, after being initialized, has a breakdown which generates detectable phenomena such as leakage currents. A first electronic structure 210 presents two transistors 211, 212, the breakdown being present only in the transistor 211 on the right of the structure 210. This transistor 211 will show different characteristics than the other one 212. A logic value of 1 may be assigned to the case in which the first transistor (for example the rightmost transistor of the pair) presents breakdown. Correspondingly, A logic value of 0 may be assigned to the case in which the second transistor (for example the leftmost transistor 222 of the pair) presents breakdown and not the first transistor 221, as shown in the second electronic structure 220. Thus, each of the elements in the exemplary 9 positions can store 1 bit (0 or 1, depending on the position of the breakdown spot within its channel), with no need of external storage. In general, the breakdown occurring in either one transistor or the other would yield the discriminating bit.

However, embodiments of the disclosed technology are not necessarily limited to two transistors per electronic structure, and three or more may be present, allowing multiple quantization values per element depending on the position of the breakdown.

Such structures are advantageously easy to manufacture, because existing routes of semiconductor processing can be readily applied to the array.

Due to the size of the transistors and the fact that the code is physically included therein, common attacking techniques may not be applicable to devices according to the disclosed technology. For example, most spectroscopic analysis techniques may not have a resolution that is high enough to reveal the position of the breakdown spot. Specifically in the case of a single circuit element, for example a transistor, per electronic structure, most spectroscopic techniques would just reveal that all the transistors (insofar initialized) suffer breakdown.

Further, the type of breakdown can also be taken into account in the disclosed technology, and be tailored in accordance to specific needs. For example, some or all transistors in some embodiments of the disclosed technology may present a soft breakdown (SBD). This type of breakdown is very difficult, or even impossible, to detect with thermal spectroscopy due to the low localized heat generation, thus improving security of an encryption system based on PUFs, according to embodiments of the disclosed technology.

Figure 2:
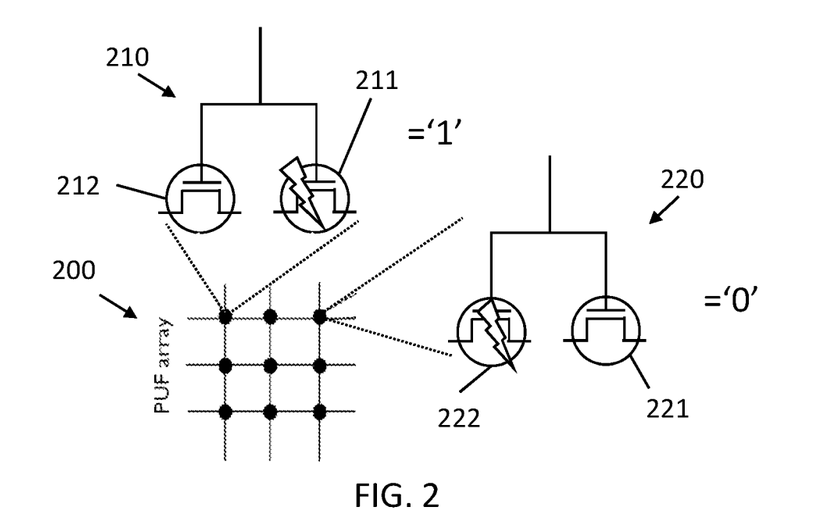
FIG. 2 illustrates another device in accordance with embodiments of the disclosed technology, in which each electronic structure for providing a breakdown signal is formed by multiple circuit elements.

The SBD can be applied to any electronic structure or circuit element including an oxide or dielectric layer, such as a three-terminal capacitor, and it is not confined to MOSFETs, or in general to FETs. The SBD can also be applied in embodiments of the disclosed technology that include for example at least two transistors with a common gate connection, for example as shown in FIG. 2. Only one of the transistors in each electronic structure may suffer the SBD, which is nearly undetectable, such that it could be very difficult or impossible to successfully attack a code encrypted with a device according to embodiments of the disclosed technology.

A device in accordance with embodiments of the disclosed technology can be obtained following traditional manufacturing routes of transistor processing. The cost of integration can furthermore be very low, and a high amount of electronic structures can be included in a single die of a wafer. No additional fabrication complexity, for example in terms of lot turns, may be needed to implement the PUF device according to embodiments of the disclosed technology. Moreover, multiple sets of PUF arrays may be included on each chip or die, which can be used to refresh or change an encryption key. The "re-programmability" of the PUF can be mimicked by addressing multiple arrays to generate multiple PUF keys. Alternatively or additionally, these multiple arrays can be utilized to provide further levels of encryption security. An additional advantage of some embodiments of the disclosed technology is its insensitivity to temperature. In embodiments of the disclosed technology, the PUF is a characteristic parameter of the breakdown (for example as opposed to a presence or absence of a breakout), in which the readout of the breakdown spot location may be independent of the operating temperature of the chip, and thus stable over its lifetime.

Figure 3:
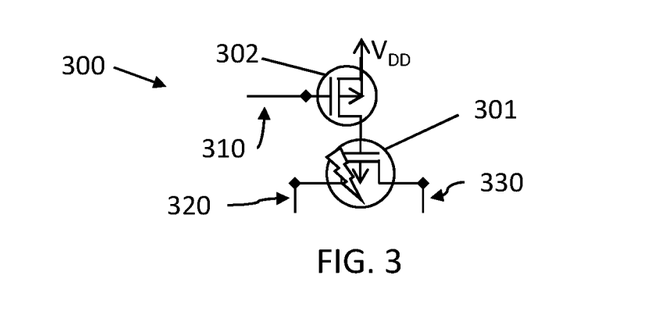
FIG. 3 illustrates yet another device in accordance with embodiments of the disclosed technology.

The device in accordance with embodiments of the disclosed technology may include an array of PUF cells, each of the cells including an electronic structure as described hereinabove. In some embodiments of the disclosed technology, the cells may include further circuit elements, switches, etc. FIG. 3 shows a PUF cell 300 including an electronic structure 301, in this example a MOSFET, including a breakdown spot. The third terminal of the electronic structure, for example the gate terminal of the transistor, may be connected to a further switch 302 (for example a transistor such as a MOSFET), which may be controlled by a voltage provided by a row line 310. The switch 302 may include (for example may be) a compliance-limiting transistor, for example to prevent "runaway" breakdown. For example, each electronic structure 301 may be connected in series to a corresponding switch 302 for compliance limiting, for example to ensure that, when initialized, each electronic structure 301 individually can be forced to breakdown, for example to be configured to output a value. Advantageously, the switch 302 may also provide the function of a row (or column) selector in an array when read out.

The polarity of the transistor of the electronic structure and the polarity of the compliance transistor may be different, for example nFET and pFET respectively, or pFET and nFET respectively.

For example, the choice of polarity for the compliance limiting transistor and the electronic structure may be used to tune the stochastic distribution of the breakdown location. For example, a substantially uniform distribution over the junctions and over the centre of the electronic structure may be preferred in one application, while a stochastic preference for breakdown at or near the junctions and a relatively low probability of breakdown occurrence near the centre may be preferred in another application. The skilled person in the art of semiconductor design, for example having a general knowledge of FET breakdown mechanisms, can be considered to be capable of making such design choices without exerting any inventive effort or requiring extensive experimentation.

Readout may be performed by comparison of current variations, as it will be explained with reference to a system according to the disclosed technology.

Each electronic structure of the array may be similar to each other, such that small stochastic differences between them are enough to produce the breakdown, although this may be controllable. For example, if a part of the PUF code needs to be fixed, some electronic structures may have different characteristics than others. The dielectric may be different in case of capacitors, or the threshold voltages of some predetermined transistors may be higher or lower than the rest of transistors of the array. For example, multi-threshold CMOS manufacturing technology can be used for such implementations.

Devices according to embodiments of the disclosed technology may also include voltage sources, voltage and current readers, analog-to-digital converters, clocking devices, etc. An encryption system and key may be obtained from a device in accordance with embodiments by addition of a readout system for determining the breakdown position in each electronic structure of the array.

Figure 4:
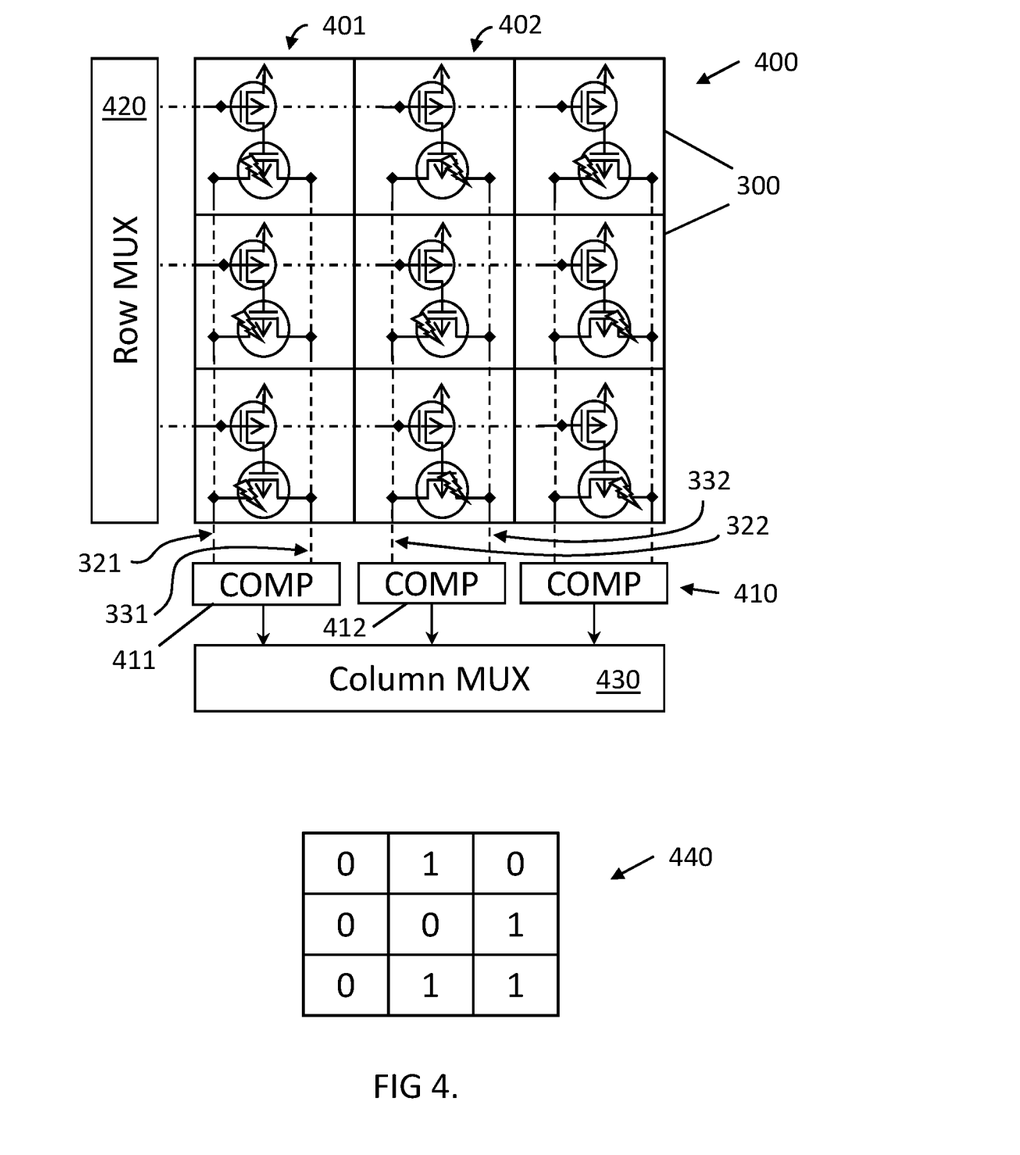
FIG. 4 illustrates a system in accordance with embodiments of the disclosed technology.

A device in accordance with embodiments of the disclosed technology may include electronic structures 101, 102, 220, 320 organized in an array, as shown in FIG. 1, FIG. 2 and FIG. 4.

The device in accordance with embodiments of the disclosed technology may furthermore include a readout system for addressing an individual electronic structure, or a subset of such electronic structures as function of row and/or column addresses, for example for selecting a row or group of rows, for selecting a column or group of columns, or for selecting an individual cell at a specific row and column intersection. The readout system may be further adapted for outputting the distinct value, as determined by the position of the conductive path formed by breakdown of the dielectric, of the addressed electronic structure(s).

The device may thus form an encryption system that includes a PUF source, in the form of the array of electronic structures, and a measurement circuit, in the form of the readout system for addressing and outputting. Such device may further include a circuit for error correction and/or a circuit for facilitating the application of the PUF, provided by readout of the PUF source, in encryption, for example an activation code constructor and/or a key extractor.

In embodiments of the disclosed technology, as described hereinabove, the location of a breakdown spot may be used to determine a logical output representative of a fragment, for example a bit, of a random PUF key or ID. Such breakdown spot location may be determined by on-chip operations via various methods, with small on-chip overhead for periphery circuits. In some embodiments, a simple current reference circuit, for example a current-mirror, may be used. The sequence of breakdown spots locations of multiple electronic structures can thereby generate a unique and unclonable identifier for every system.

In a device in accordance with the embodiments of the disclosed technology, the identification or detection of the breakdown spot can be obtained by reading out a gate leakage current at a fixed voltage, for example at a chip operating voltage $V_{DD}$, and at least two different voltage drops via respectively the drain and source. This may be determined by a reference circuit. The PUF may be implemented by a FET pair and a single compliance limiter per pair.

FIG. 4 shows a device 400 of PUF cells 300, as described hereinabove with reference to FIG. 3. As shown in FIG. 3, each drain terminal of each electronic structure may be connected to a column line 320, and each source terminal may be connected to another column line 330. Thus, a first column 401 of the array may include two column lines 321, 331; the second column 402 may include another two column lines 322, 332, etc. The signal of the lines in each column may be introduced in a system 410 of comparators, for example including a comparator 411, 412 per column. The digital value of each PUF cell 300 may thus be determined by comparing, for example evaluating a difference of, the voltage drop between each of the two column lines (which in turn is determined by the breakdown spot position). The readout can thus be performed for all transistors in a single row addressed by the row multiplexer 420, for example in which the row multiplexer selects a single row by activating the switches 302 in this row via the corresponding row selection line 310, while deactivating the switches 302 in other rows.

For example, a single comparator 411, 412 per column 401, 402 may be used for comparing the voltage difference (with respect to VDD) sensed at the source side of the PUF cell in the selected row and the corresponding column via a first column line 321 and the voltage difference (with respect to VDD) sensed at the drain side of that PUF cell via the second column line 322. The result of this comparison may be sent to a column multiplexer 430. These features may advantageously contribute to die area reduction, increasing compactness of the system and increasing device density in the wafer. In alternative embodiments, the readout of each row can be done in parallel, increasing the readout speed. In the exemplary embodiment of FIG. 4, the row multiplexer 420 may address a whole row, but individual PUF cell selection and readout can also be done via row and column multiplexers, if access to a single PUF cell is preferred.

The particular exemplary array 400 of FIG. 4 results in a 3×3 matrix of code. For example, if the exemplary value assignment depicted in FIG. 1 is applied to the array of FIG. 4, the readout of the first row would result in the detection of breakdown in the gate-source side for the column 401, thus generating a 0, and the detection of breakdown in the gate-drain side of the column 402, thus generating a 1. The matrix 440 shows the code resulting from the readout of the array 400 of FIG. 4.

Figure 5:
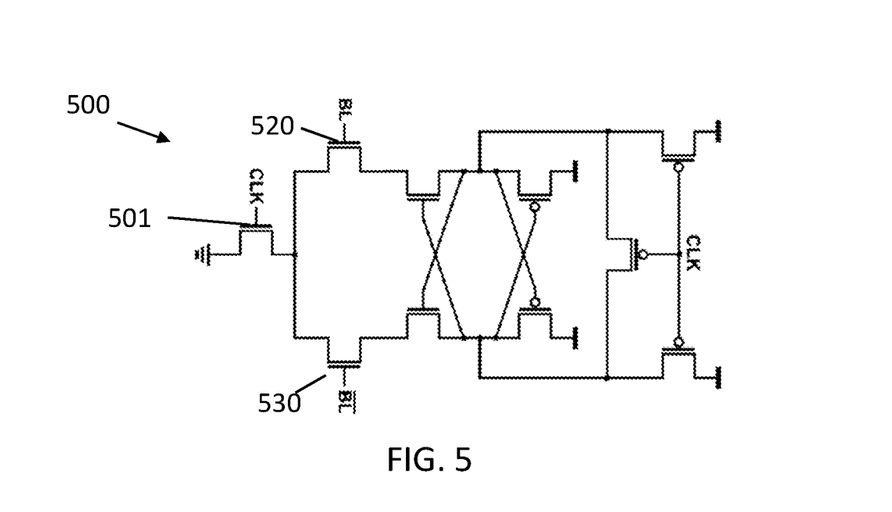
FIG. 5 illustrates an exemplary sensor amplifier for readout of a system in accordance with embodiments of the disclosed technology.

Furthermore, in a device in accordance with embodiments of the disclosed technology, the comparator or comparators may include a current-ratio comparator. In some embodiments, the read out may be based on a sense amplifier and a driver. FIG. 5 shows a sense amplifier 500 suitable for use in embodiments according to the disclosed technology, in which a speed of discharging is measured and compared, in order to determine a breakdown position in each electronic structure. This speed is measured using a clocked input 501. The inputs of the gates 520, 530 may correspond to the lines 320, 330 of the PUF cell of FIG. 3, and the lines may be connected to all the PUF cells of a column 401 of the array in FIG. 4. In general, the first input gate 520 may be connected to a source (or drain) of a transistor with breakdown, and the second gate 530 to the drain (or source, respectively) thereof.

In a simple single-bit case, in order to read out the location of the generated breakdown spot in the structure, the gate leakage current at a fixed gate voltage may be read out. An example of readout may include a pre-charge step, in which the lines 320, 330 receive a potential $V_{DD}$. A read step follows, in which the switch 302 is activated, and a current is generated in each line. These currents $I_1$, $I_2$ are different from each other, because of the breakdown taking place in either source side or drain side, for example closer to either the drain or the source terminal, such that an additional leakage current occurs in at least one of the lines. After a period of time $\Delta t$, the variation of the voltages associated to the currents $I_1$ and $I_2$ is obtained in each line as $V_{DD}-\Delta V_1$ (in the first gate 520 of FIG. 5 for the line, connected to the same terminals of all the electronic structures of the same column) and $V_{DD}-\Delta V_2$ (in the second gate 530 for the second line of the column):

$$\Delta V_1 - \Delta V_2 = V_{DD} - [(I_1-I_2)/C_P]\Delta t$$

The sense amplifier may thus flip when the difference of voltage variations surpasses a certain threshold, $\Delta V_1 - \Delta V_2 > \Delta V$.

In some exemplary embodiments, if the gate leakage current variation between both measurements on the same structure is higher than a certain threshold, the breakdown spot is allocated as 'drain-side' thereby, outputting a 1. If the breakdown spot closer to the source, the output is a 0. As it has been seen before, the threshold can be tuned to yield an overall entropy of 50%.

For higher accuracy of detection of the breakdown spot within a channel, percolation modelling and current-ratio calculations and measurements, known in the art, allows obtaining the position of the breakdown spot with a predetermined range of reliability. For example, this range of reliability may represent a trade-off between a high number of bits per FET, for example a reduction of required area, and a potential increase of bit error rate, which may be compensated by error-correction means that could also adversely affect the area usage.

Thus, if the accuracy of the read-out is high enough, multiple values can be physically stored in each PUF cell of the array (for example multiple bits per transistor can be read out), making it possible to reduce the overall area-usage of the PUF array. For example, each cell may store 4 bits, for example provide $2^4$ quantization levels, embodiments of the disclosed technology not being limited thereby.

Figure 6:
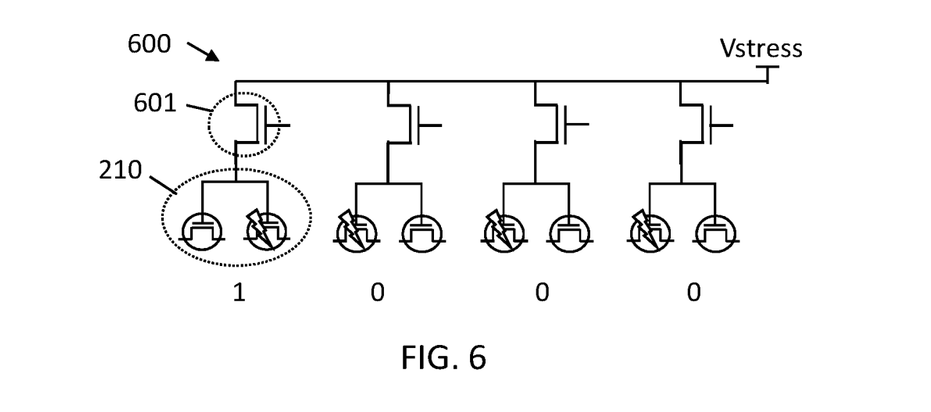
FIG. 6 illustrates at least one circuit element for use in an electronic structure in a device in accordance with embodiments of the disclosed technology.

A second alternative implementation, shown in FIG. 6, for sensing the breakdown position in an electronic system is by using an electronic structure 210 including two FETs connected by their gates, one of which presents breakdown. One single compliance limiter 601 can be included per FET-pair, which can be used to produce the breakdown, for example during manufacture or afterwards. Furthermore, this compliance limiter 601 may be advantageously also used as a row selection switch, for example controlled by a row multiplexer, during readout after initialization of the device. The device in accordance with embodiments of the disclosed technology may include current or voltage comparators, a column multiplexer as seen in FIG. 4, comparators based on sense amplifiers and discharge time, or any other readout system, for example a 1T1R configuration. Embodiments of the disclosed technology may provide an extremely robust encryption system, for example robust against various types of time dependent variability, such as robust against reading errors and/or temperature variations, with good randomness, and due to the low IG, stress conditions not dependent on layout or line length. The breakdown included in each electronic structure may be SBD, improving the system resilience against attacks.

Several arrays and encryption systems may be included in the same semiconductor dice, which may create a "reset" effect, allowing reutilization. In some embodiments, the breakdown may be provided during manufacture of the device. In other embodiments, the breakdown may be provided later, ensuring a longer shelf life of the device and allowing dynamic code encryption. For example, use of a particular encrypted code may be done for a period of time. If at any point the code needs to be refreshed ("reset"), a second array in the same chip can be used, generating a breakdown in uninitialized PUF cells where such breakdown was not yet present before.

Figure 7:
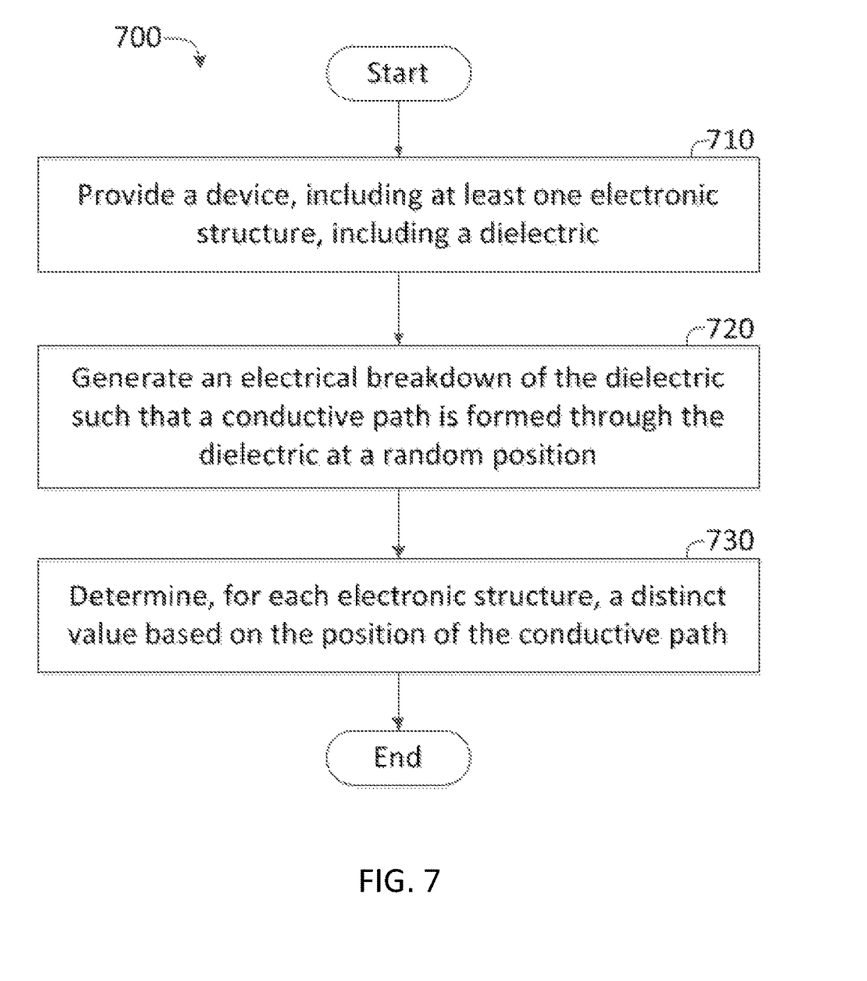
FIG. 7 illustrates a flowchart of a method of implementing a physically unclonable function in accordance with embodiments of the disclosed technology.

FIG. 7 illustrates a flowchart of a method 700 of implementing a physically unclonable function in accordance with embodiments of the disclosed technology, for example for encryption. In block 710, the method 700 provides a device that includes at least one electronic structure, in which this (or each such) electronic structure includes a dielectric.

In block 720, method 700 generates an electrical breakdown of the dielectric such that a conductive path is formed, in each of the at least one electronic structure, through the dielectric at a random position. Thus, method 700 may be provided in accordance with embodiments of the disclosed technology, which may include providing a controlled, random, breakdown in an electronic structure, for example in each such electronic structure in an array of such electronic structures. For example, the device may be provided as a device including an array of transistors, and the electrical breakdown may be generated by applying a high gate bias on each transistor to form a conductive path between a gate of the transistor, on one hand, and, by random embodiment of the breakdown, either a source or a drain of the transistor, on the other hand.

In a method in accordance with embodiments of the disclosed technology, generating the electrical breakdown may include generating a plasma damage during the step of providing the device.

In block 730, method 700 determines, for each of the at least one electronic structure, a distinct value of a set including at least two predetermined values, in which this distinct value is determined by the position of the conductive path through the dielectric of that electronic structure. For example, this determining the distinct value for each electronic structure may include addressing the electronic structure in an array of such electronic structures and performing a readout of the stored distinct value.

Figure 8:
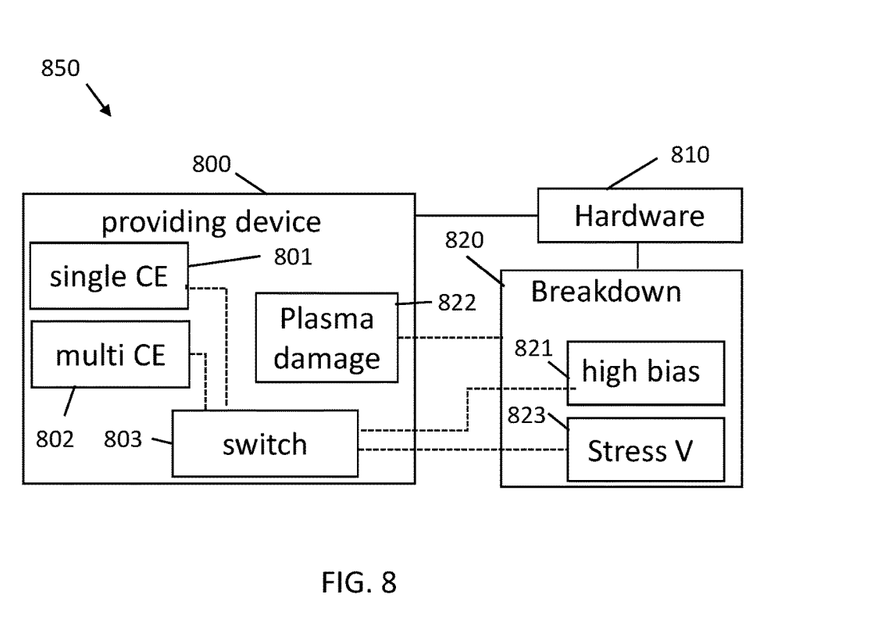
FIG. 8 illustrates a method of production of a device and/or system in accordance with embodiments of the disclosed technology.

FIG. 8 shows a flowchart of an exemplary method 850 in accordance with embodiments of the disclosed technology. In block 800, method 850 provides a device including an array. In an embodiment, method 850 may provide the array in a semiconductor wafer via CMOS or other production routes. In an embodiment, the device includes a single circuit element 801 onto which the breakdown will be generated, and it may optionally include multiple circuit elements 802 per electronic structure, for example as shown in FIG. 2. In such embodiments, source, bulk and/or drain connections may be shared amongst the circuit elements. However, not necessarily all bulk connections are shared. For example, the polarity of transistors forming the circuit elements and of compliance transistors associated with the electronic structure may be different, for example respectively nFET and pFET, or respectively pFET and nFET. The bulk connection of the transistors forming the circuit elements and the compliance transistors may be separate to advantageously avoid a breakdown in the compliance transistors.

In an embodiment, in block 800 method 850 provides an optional switch 803 for stress control and/or for addressing the electronic structure. For example, for each electronic structure, a corresponding switch may be provided that is connected in series with a gate of a transistor of the electronic structure, in which the dielectric is formed by a gate dielectric, for example a gate oxide, of the transistor. Or, in another example, for each electronic structure, switches may be provided that are connected in series with a source and a drain of a transistor of the electronic structure. The small size of the transistors and the flexibility of design in MOS and CMOS manufacture may allow the inclusion of two (or more) transistors per PUF cell. An array of electronic structures can be included on a chip, for example a semiconductor (for example silicon) chip, each of them with a separately accessible gate. Moreover, further arrays can be included, and a compact and reprogrammable device (for example with multiple arrays per die) may also be provided, as discussed hereinabove.

In block 810, method 850 provides addressing circuits, comparators and readout circuits, in the form of encryption system hardware. This encryption system hardware may be fully integrated in the device, partly integrated in the device, or may form an external reader to which the device can be connected for providing a readout.

In block 820, method 850 generates an electrical breakdown of the dielectric such that a conductive path is formed, in each of the at least one electronic structure, through the dielectric at a random position. For example, a high-gate bias may be applied 821 on the electronic structures, for example applying the bias for a short time, and/or a compliance-limited bias in order to generate a breakdown. In an embodiment, a switch 803, such as an additional FET, may be provided in series with the gate to be stressed, to provide a compliance-limited bias. Additionally or alternatively, this bias can be generated by intentional plasma-induced-damage 822, for example by not PID-protecting the array of electronic structures during production of the array. At this stage, the breakdown locations are randomly burned-in on every electronic structure in the PUF array on the chip. Multiple PUF-sets can be programmed at this stage on the die for later use. The breakdown conditions can be tuned depending on the oxide characteristics of the gate stack used in the fabrication process. Generating the breakdown may be performed once per array, for example it can be done during fabrication, and/or afterwards during utilization. The device may include, however, a plurality of sets, for example arrays, of the electronic structures described hereinabove, which may be initialized by generating breakdowns of the dielectrics included therein at different time instants. For example, while each electronic structure may be initialized only once, for example by generating the dielectric breakdown, different electronic structures or sets of electronic structures may be initialized at different times.

In some embodiments, in which each electronic structure includes a plurality of circuit elements, the plurality of elements (for example the gates of a pair of MOSFETs) may be connected to one of the terminals of a switch (for example the source or drain of a compliance-limiting MOSFET). A stress voltage may be introduced 823 via the stress switch (for example a transistor) to produce the breakdown. Due to the compliance limiting transistor, when one of the elements (for example MOSFETs) suffers breakdown, stress on the other element will be immediately relieved. Thus, it can be assured that only 1 breakdown per FET-pair is generated. Generating the breakdown may include either generating SBD, improving its protection, or generating a hard breakdown, which decreases the readout errors. The value assigned to the PUF cell (0 or 1) can be read simply by detecting which element of the electronic structure presents breakdown.

The breakdown locations may be randomly burned-in on every electronic structure in the PUF array on the chip, ensuring randomization and symmetric bit distribution. As explained, a generated code, as represented by the distinct value or a string of distinct values obtained from a plurality of electronic structures as discussed hereinabove, does not need to be stored in a memory, but is "burned-in" in each electronic structure, thus saving energy as no charge storage is needed. The code may be read out electrically, for example the bits are stored within the transistor and not stored as a charge. Because the localized heat generation may be low (in embodiments including SBD), thermal imaging may not be useful to detect the code. Additionally, the bits may be stored as a chain of atomistic defects in an ultra-thin semiconductor and/or dielectric layer, making it very difficult to perform reverse engineering (for example with scanning electron microscopy). A code can be programmed in a completely random way, since a breakdown position may be determined by a weakest link in the dielectric, which is not controllable, under normal and homogenous manufacturing conditions. Furthermore, a device in accordance with embodiments can be easily processed in silicon without any additional processing steps as would be required for the manufacture of flash memory, thus providing a low cost of implementation.

A device and/or method according to embodiments of the disclosed technology can be used in a similar way as a non-volatile memory NVM, and can largely replace it. An exemplary application of a device in accordance with embodiments would be in Internet-Of-Things sensor applications, where data encryption may typically require an ultra-low power usage and a low-cost implementation, yet may require an at least moderate security, for example the security is supposed be proportional to the sensitivity of the data. For example, a device and/or method in accordance with embodiments of the disclosed technology may be used in security systems of locks, computers, appliances and portable devices.

In embodiments where transistors are used for providing the electronic structure as discussed hereinabove, a breakdown can be generated by application of a high bias on the gate (for example 4 volts). A leakage path is then obtained in the transistor. Each electronic structure (for example each transistor) may include at least a bit, thus generating a bit string per row. Some embodiments may include further quantized levels per electronic structure. For example, each row may have an electronic "barcode" embedded, in which the position of each "barcode mark" corresponds to the position of a breakdown spot within a channel in each transistor of a row or a complete array. For example, six transistors in the same row may provide a six "marks" in the "barcode". Overlapping of "marks" would take place only if the breakdown spot is the same (within the error margin of detection) for two transistors.

The various features and processes described herein may be implemented independently of one another, or may be combined in various ways. All possible combinations and sub combinations are intended to fall within the scope of this disclosure. In addition, certain methods or process blocks may be omitted in some implementations. The methods and processes disclosed herein are also not limited to any particular sequence, and the blocks or states relating thereto can be performed in any other sequences that are appropriate. For example, described blocks or states may be performed in an order other than that specifically disclosed, or multiple blocks or states may be combined in a single block or state. The example blocks or states may be performed in serial, in parallel, or in some other manner as appropriate. Blocks or states may be added to or removed from the disclosed example embodiments as suitable. The example systems and components described herein may be configured differently than described. For example, elements may be added to, removed from, or rearranged compared to the disclosed example embodiments. Various embodiments can apply different techniques for fabricating different types of electronic devices.

While certain embodiments have been described, these embodiments have been presented by way of example only, and are not intended to limit the scope of the disclosure. Indeed, the novel devices, systems, apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments.

What is claimed is:

1. A method of implementing a physically unclonable function, the method comprising:
providing a device comprising at least one electronic structure, each electronic structure comprising a dielectric,
generating an electrical breakdown of the dielectric such that a conductive path is formed, in each of the at least one electronic structure, through the dielectric at a random position,
determining, for each of the at least one electronic structure, a distinct value of a set comprising at least two predetermined values, wherein the distinct value is determined by the position of the conductive path through the dielectric of the electronic structure.

2. The method of claim 1, wherein the device comprises an array of transistors, and wherein generating the electrical breakdown comprises applying a high gate bias on each transistor to form a conductive path between a gate and randomly either a source or a drain of the transistor.

3. The method of claim 1, further comprising generating plasma damage in the at least one electronic structure.

4. A PUF device for implementing a physically unclonable function, the device comprising:
at least one electronic structure, each electronic structure comprising a dielectric; and
a conductive path through the dielectric at a random position,
wherein each electronic structure is configured to output a distinct value of a set comprising at least two predetermined values, and wherein the distinct value is determined by the position of the conductive path through the dielectric.

5. The PUF device of claim 4, wherein the conductive path is formed due to an electrical breakdown of the dielectric.

6. The PUF device of claim 4, wherein the electronic structure is adapted for generating an electrical breakdown of the dielectric such that the conductive path is formed through the dielectric at the random position.

7. The PUF device of claim 4, wherein the at least one electronic structure comprises at least one circuit element that comprises a first terminal, a second terminal and a third terminal electrically insulated from each other by the dielectric.

8. The PUF device of claim 7, wherein the at least one electronic structure is adapted for determining the distinct value by detecting the position as being either closer to the first terminal or closer to the second terminal.

9. The PUF device of claim 7, wherein the at least one circuit element comprises a field effect transistor comprising a gate dielectric, a drain, a source and a gate terminal,
wherein the conductive path is either formed in the at least one electronic structure through the gate dielectric or the at least one electronic structure is adapted for generating the electrical breakdown in the gate dielectric such that the conductive path is formed through the gate dielectric, such that the conductive path conductively connects the gate terminal to at least one of the source and the drain, and
wherein the position is a position between the source and the drain.

10. The PUF device of claim 9, wherein the at least one electronic structure is adapted for obtaining a voltage drop at the drain and at the source, and determining the distinct value as a function of the voltage drops.

11. The PUF device of claim 9, wherein the conductive path is formed due to an electrical breakdown of the dielectric.

12. The PUF device of claim 11, wherein the electronic structure is adapted for generating an electrical breakdown of the dielectric such that the conductive path is formed through the dielectric at the random position.

13. The PUF device of claim 12, wherein the device comprises an array of transistors, and wherein generating the electrical breakdown comprises applying a high gate bias on each transistor to form a conductive path between a gate and randomly either a source or a drain of the transistor.

14. The PUF device of claim 7, wherein the at least one electronic structure comprises at least a further circuit element that comprises at least a first terminal, a second terminal and a third terminal electrically insulated from each other by the dielectric, the third terminal of the circuit element being connected to the third terminal of the further circuit element.

15. The PUF device of claim 14, wherein the device is adapted for detecting a transistor breakdown in each of the circuit element and the further circuit element of the electronic structure.

16. The PUF device of claim 7, further comprising a compliance-limited transistor switch in series with the at least one circuit element.

17. The PUF device of claim 4, wherein the electrical breakdown is a soft breakdown.

18. The PUF device of claim 4, further comprising a plurality of the electronic structures organized in an array, and further comprising a readout system for addressing an individual electronic structure, or a subset of the electronic structures, as function of row and/or column addresses and outputting the distinct value of the addressed electronic structure or the addressed subset of electronic structures.

19. The PUF device of claim 18, wherein the readout system comprises a row multiplexer and/or a column multiplexer, and wherein the readout system comprises at least one comparator for comparing a pair of voltage differences sensed at a corresponding pair of different regions of the dielectric in the addressed electronic structure.

20. The PUF device of claim 18, further comprising a plurality of arrays in a semiconductor die, each array of the arrays comprising a plurality of the electronic structures, each array being adapted for storing a corresponding encryption key.

* * * * *